(12) United States Patent
Fan et al.

(10) Patent No.: US 8,660,373 B2
(45) Date of Patent: Feb. 25, 2014

(54) PDF DE-CHUNKING AND OBJECT CLASSIFICATION

(75) Inventors: Zhigang Fan, Webster, NY (US); Reiner Eschbach, Webster, NY (US); Michael Branciforte, Rochester, NY (US); Farzin Blurfrushan, Torrance, CA (US); Roger L. Triplett, Penfield, NY (US); Raymond J. Clark, Webster, NY (US); William A. Fuss, Rochester, NY (US); Michael E. Farrell, Ontario, NY (US); David E. Rumph, Pasadena, CA (US)

(73) Assignee: Xerox Corporation, Norwalk, CT (US)

( * ) Notice: Subject to any disclaimer, the term of this patent is extended or adjusted under 35 U.S.C. 154(b) by 1534 days.

(21) Appl. No.: 12/177,321

(22) Filed: Jul. 22, 2008

(65) Prior Publication Data

US 2010/0021069 A1  Jan. 28, 2010

(51) Int. Cl.
  *G06K 9/62*  (2006.01)
  *G06K 9/72*  (2006.01)
  *G06K 9/44*  (2006.01)
  *G06F 17/30*  (2006.01)

(52) U.S. Cl.
  USPC .......... 382/229; 382/224; 382/256; 382/159; 382/165; 707/722

(58) Field of Classification Search
  USPC ......... 382/103, 107, 117, 118, 162, 164, 165, 382/173, 283, 199, 181, 190, 254, 256, 295, 382/294, 312, 320, 321, 224–231; 358/3.27, 403, 449, 486, 488; 703/2; 707/722–735, 705
  See application file for complete search history.

(56) References Cited

U.S. PATENT DOCUMENTS

| | | | | |
|---|---|---|---|---|
| 5,767,978 | A * | 6/1998 | Revankar et al. | 358/296 |
| 6,411,742 | B1 * | 6/2002 | Peterson | 382/284 |
| 7,010,152 | B2 * | 3/2006 | Bojer et al. | 382/132 |
| 7,296,257 | B1 * | 11/2007 | Dibble et al. | 717/127 |
| 7,420,712 | B2 * | 9/2008 | Nagarajan et al. | 358/3.27 |
| 7,668,351 | B1 * | 2/2010 | Soliz et al. | 382/128 |
| 8,073,263 | B2 * | 12/2011 | Hull et al. | 382/224 |
| 2003/0185457 | A1 * | 10/2003 | Campbell | 382/254 |
| 2004/0004641 | A1 * | 1/2004 | Gargi | 345/848 |
| 2004/0008383 | A1 * | 1/2004 | Klein et al. | 358/3.06 |
| 2005/0180628 | A1 * | 8/2005 | Curry et al. | 382/164 |
| 2006/0023217 | A1 * | 2/2006 | Bangalore et al. | 356/418 |
| 2006/0126932 | A1 * | 6/2006 | Eschbach | 382/173 |
| 2007/0103652 | A1 * | 5/2007 | Nijim et al. | 353/94 |
| 2007/0116366 | A1 * | 5/2007 | Deninger et al. | 382/224 |
| 2008/0199096 | A1 * | 8/2008 | Farrell et al. | 382/254 |
| 2008/0253622 | A1 * | 10/2008 | Tosa et al. | 382/117 |
| 2009/0013129 | A1 * | 1/2009 | Bondurant | 711/115 |
| 2009/0019246 | A1 * | 1/2009 | Murase | 711/162 |

(Continued)

*Primary Examiner* — Chan S Park
*Assistant Examiner* — Mia M Thomas
(74) *Attorney, Agent, or Firm* — Fay Sharpe LLP

(57) ABSTRACT

Systems and methods are described that facilitate identifying objects in a document (e.g., a PDF document) for automatic image enhancement (AIE). A PDF document is "chunked" or segmented into chunks, and boundaries between chunks are identified as real or imaginary. Chunks sharing imaginary boundaries are combined, while real boundaries are retained, to generate "de-chunked" objects. These objects are then classified, and an AIE application is executed on objects meeting pre-specified classification criteria. In this manner, objects of r which AIE is not desired are not subjected to the AIE application, thereby saving time and processing resources associated with enhancing the document.

21 Claims, 6 Drawing Sheets
(2 of 6 Drawing Sheet(s) Filed in Color)

(56) References Cited

U.S. PATENT DOCUMENTS

| | | | |
|---|---|---|---|
| 2009/0177855 A1* | 7/2009 | Drews et al. | 711/162 |
| 2009/0220120 A1* | 9/2009 | Yen et al. | 382/100 |
| 2009/0290807 A1* | 11/2009 | Marchesotti | 382/261 |
| 2010/0014776 A1* | 1/2010 | Marchesotti | 382/275 |
| 2010/0021069 A1* | 1/2010 | Fan et al. | 382/224 |
| 2010/0266214 A1* | 10/2010 | Jobson et al. | 382/224 |

* cited by examiner

PDF DE-CHUNKING AND OBJECT CLASSIFICATION

BACKGROUND

The subject application relates to image enhancement in a scanning or printing system. While the systems and methods described herein relate to image enhancement of portable document format (PDF) documents, it will be appreciated that the described techniques may find application in other printing systems, other image processing applications, and/or other scanning systems.

The use of automatic image enhancement (AIE) techniques in customer environments has exposed PDF workflow related problems that, at a generalized level, have a deleterious impact on the capabilities of print environment management software packages. These problems are common in end-user created PDF documents.

End-user created PDFs may be correct in the sense of describing the desired printed image with the PDF specification, but simultaneously incorrect in the sense of not codifying appropriate relationships between objects, thereby precluding comprehension of these relationships by systems processing the PDFs. As a result, sophisticated processing modules inside print environment management software packages, such as AIE, have incomplete PDF encoding to steer processing and are not aware of these relationships, which in turn leads to incorrect assumptions and decisions. This can result in gross image defects and artifacts.

The distinction between "PDF construct" and "human recognition" is gaining more and more relevance for printer/scanner manufacturers. Accordingly, more and more processing is required on the PDF components in order to maximize quality. Even more importantly, the processing has to be done in a fully automated, lights-out, manner.

Attempts to improve AIE for PDF documents have dealt exclusively with bitmaps (i.e., images, but not graphics). In a document containing both images and graphics, the graphical objects may touch each other. They may also touch image bitmaps. Conventional systems do not determine if the touching objects, including graphical objects, should be processed together or separately. Rather the bitmaps are stitched together based mainly on configuration conditions. Specifically, each bitmap needs to be rectangular, and so does the resulting stitched bitmap. Such systems are not capable of addressing non-rectangular objects (including non-rectangle images). Moreover, color consistency (e.g., whether the touching objects have similar color along the boundary) is not assessed. As a result, these systems stitch all objects into one large bitmap, which is undesirable. Moreover, these techniques stitch together objects that happen to have the same width and are neighboring each other.

Accordingly, there is an unmet need for systems and/or methods that facilitate mitigating problems associated with end-user generated PDFs with regard to AIE and object optimized rendering techniques while overcoming the aforementioned deficiencies.

BRIEF DESCRIPTION

In accordance with various aspects described herein, systems and methods are described that facilitate PDF de-chunking and object classification. For example, a method of identifying foreground image objects in portable document format (PDF) documents for automatic image enhancement (AIE) comprises segmenting objects in a PDF document into a plurality of chunks, analyzing boundaries between pairs of chunks to determine whether each boundary is real or imaginary, de-chunking the objects by retaining real boundaries and combining chunks that share an imaginary boundary, and classifying de-chunked objects to identify objects for AIE processing.

According to another feature described herein, a selective image enhancement system for portable document format (PDF) documents comprises a memory that stores a PDF document, and a processor that executes chunk generation instructions stored in the memory to segment PDF objects into a plurality of chunks. The processor further generates a chunk ID map, a chunk class map, and an image bitmap, and executes a boundary classifier that determines whether boundaries between pairs of chunks are real or imaginary. Additionally, the processor executes chunk clustering instructions to combine chunks that share an imaginary boundaries and retain real boundaries that define the PDF objects, executes an object classifier that classifies objects into different classes, and identifies objects for automatic image enhancement (AIE) as a function of object class.

Yet another feature relates to an apparatus for selectively enhancing images in a portable document format (PDF) document, comprising means for segmenting objects in a PDF document into a plurality of chunks, means for analyzing boundaries between pairs of chunks to determine whether each boundary is real or imaginary, and means for de-chunking the objects by retaining real boundaries and combining chunks that share an imaginary boundary. The apparatus further comprises means for classifying de-chunked objects to identify objects for AIE processing, and means for executing an automatic image enhancement (AIE) application on the identified objects.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

DETAILED DESCRIPTION

Figure 1:
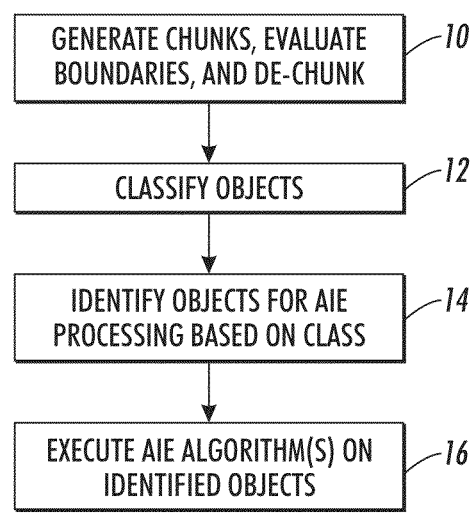
FIG. 1 illustrates a method that associates PDF objects as they would be by a human observer and selectively enhances objects identified as being suitable for AIE.

In accordance with various features described herein, systems and methods are described that facilitate image "de-chunking" or parsing, and classification in PDF documents. With reference to FIG. 1, a method is illustrated that first associates the PDF objects as they would be by a human observer. The resulting objects are then classified into foreground/background, graphics/images and small/normal sized. Only appropriate images (typically normal-sized foreground images) are sent for AIE processing. At 10, objects (e.g., images, graphics, etc.) on a page in a PDF document are associated or identified as they would be by a human observer and chunks are generated. For instance, a region on the PDF page may comprise several individual objects. Boundaries between the objects are identified to associate or "de-chunk" the separate objects with each other within the region.

At 12, the objects are classified as background or foreground, graphics or images, small or normal sized, etc. According to an example, each identified object size is compared to a predetermined object size, and, if the object size is below the predetermined threshold size, the object is classified as "small." In one embodiment, the predetermined size is a function of a number of pixels in the object. In another embodiment, the predetermined threshold size is a function of the dimensions of the object (e.g., length, width, surface area, etc.).

The distinction between graphics and images can be made, for instance, by examining the chunks that compose the object. An object whose members are all IMAGE is classified as IMAGE, and an object whose members are all GRAPHICS is classified as GRAPHICS. Objects whose members include both IMAGE and GRAPHICS members are classified as MIXED. An object whose height and width (or surface area, or some other suitable metric(s)) do not exceed a predetermined threshold T4 is considered as SMALL.

The distinction between background and foreground objects can be made, for instance, by evaluating data seams at object boundaries, determining whether one object overlays another, etc.

At 14, objects that are determined to be foreground image objects of normal size, or foreground mixed objects of normal size, are identified for AIE processing. Objects that are classified as one or more of graphic objects, small objects, and/or background objects need not be subjected to AIE processing, which saves computational resources and time and prevents introducing artifacts. At 16, an AIE algorithm is executed on the identified objects.

Figure 2:
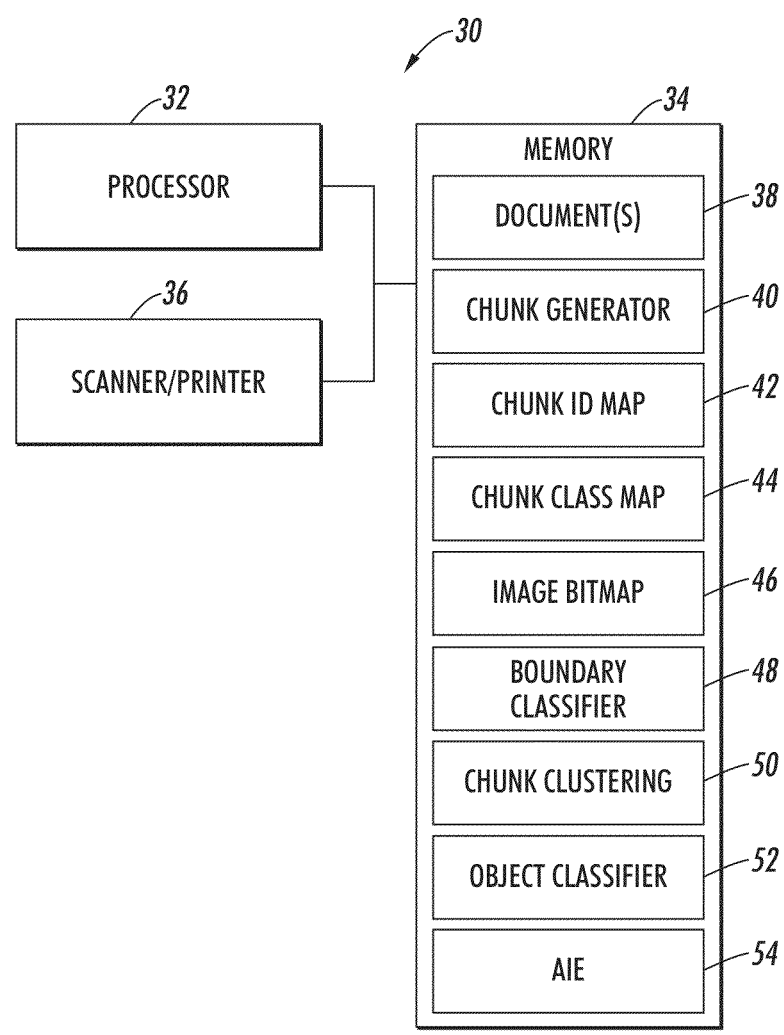
FIG. 2 illustrates a system that facilitates object "de-chunking" and classification to distinguish between image objects that are suitable for AIE processing and objects that are not suitable for AIE processing.

FIG. 2 illustrates a system 30 that facilitates object "de-chunking" and classification to distinguish between image objects that are suitable for AIE processing and objects that are not suitable for AIE processing. For instance, the system 30 groups PDF objects into groups that would be meaningful to human observers. The grouped objects are then classified into foreground/background, graphics/images and small/normal sized. Normal sized foreground image and/or mixed objects are sent for AIE processing. The PDF objects are referred to as "chunks" in the description of FIG. 2, and the word "object" is reserved for objects resulting from the "de-chunking" procedure.

The system 30 includes a processor 32 that executes, and a memory 34 that stores, computer-executable instructions and information for performing the various actions described herein with regard to PDF de-chunking and object classification. The system further optionally comprises a scanner/printer device 36 that scans hard copies of documents to generate PDF documents 38 or another suitable type of document. In another embodiment, the PDF documents 38 are generated (e.g., converted) from electronic documents by the processor 32 using a conversion application and stored to memory 34.

The de-chunking technique employed by the processor 32 comprises three procedures: chunk generation, boundary classification, and chunk clustering or de-chunking. The processor 32 decomposes the PDF documents 38 and executes a chunk generator component 40 (e.g., an algorithm or computer-executable instructions) to generate three bitmaps: a chunk identity (ID) map 42, a chunk class map 44, and an image bitmap 46.

In one embodiment, the image bitmap 46 is what normally results when a page is rendered. The image bitmap 46 has a width and height as indicated by values in the page description that control the page size. The dimensions of the image bitmap 46 (e.g., widths, heights, etc.) are determined by the page description and the resolution at which the page is rendered.

The chunk ID map 42 indicates the order in which objects are painted (e.g., printed or rendered) on the page with respect to a page display list (e.g., a content stream). Objects appearing early in the display list may be painted over by succeeding objects in the display list. One or more pixels in the chunk ID map may share a common ID value. To resolve ambiguity between such pixels, the chunk ID map 42 has the same width and height as the image bitmap 46 so that each bitmap pixel has a known chunk ID.

The chunk class map 44 indicates source object type for each pixel in the image bit map 46. Object types may be TEXT, PICTURE (including PDF raster), GRAPHICS (including PDF stroke, fill objects) etc. The TEXT objects may be discarded in the further analysis. The chunk class map 44 has the same width and height as the image bit map 46 so that the source object type and source object colorspace are known for each bitmap pixel.

From these three bitmaps, the boundaries between two touching chunks are identified and classified as real or imaginary by a boundary classifier 48 that is executed by the processor 32. Chunks that touch each other without a real boundary are merged into an object.

According to an example, if two chunks are generated from one object due to PDF generation, sudden changes are not expected when crossing their common boundary. Conversely, if the chunks originated from two objects, it is highly likely that there exists an edge (e.g., a data seam) between the two chunks. However, the above observations are only valid in a statistical sense, and hence may not always be true. In addition, noise and texture existing in the images, as well as edges in the vicinity of the boundary, may also contribute to ambiguity during boundary classification.

To resolve such ambiguity, a multi-resolution approach is adopted. In one embodiment, color differences are compared across the boundary at a low resolution, which is not sensitive to noise and texture. Edge location is detected at a high resolution, which provides spatial accuracy. A real boundary is declared only if both tests are positive. In addition, classification decision thresholds are adapted to a local noise level as well as chunk classes. The algorithm executed by the processor 32 is described more in detail as follows.

A "strength" is determined for each boundary pixel in the image. The boundary pixel (m,n) is defined to be a pixel with an ID such that either $ID(m,n) \neq ID(m+1,n)$ (for a vertical boundary), or $ID(m,n) \neq ID(m,n+1)$ (for a horizontal boundary), where $ID(m,n)$ is the chunk ID of the boundary pixel. The decision is made at two resolutions: at the low resolution, the average colors of the neighboring areas are compared.

More specifically, two windows are established at both sides of the boundary. The average colors in the windows, as well as the standard deviations of the L* components are calculated. The boundary is considered to be WEAK if the average color difference is smaller than a predetermined threshold T1, which is determined as a function of the chunk classes. As the graphics are usually almost noise free, T1 is much lower if either C(m,n)=GRAPHICS or C(m+1,n)=GRAPHICS (for a vertical boundary), or C(m,n+1)=GRAPHICS (for a horizontal boundary), where C(m,n) is the class of the boundary pixel (m,n) that is obtained from the class map. The threshold is higher if one of the pixels is classified as IMAGE. A further test at high resolution (e.g., pixel level) is performed if the window color difference exceeds the threshold T1. The color difference between (m,n) and (m+1,n) (for a vertical boundary), or between (m,n) and (m,n+1) (for a horizontal boundary) is compared to another predetermined threshold, T2. T2 is proportional to the local noise level, and is also class dependent.

In one embodiment, T2 is defined such that:

$$T2 = a \, \text{Min}(\sigma 1, \rho 2)$$

where σ1 and σ2 are the standard deviations of L* components obtained for the windows, and a is a class-dependent factor (higher for IMAGE and lower for GRAPHICS). The strength for the boundary pixel is considered to be STRONG (or WEAK) if the color difference is higher (or lower) than T2.

The numbers of STRONG and WEAK boundary pixels are summed for the entire boundary between chunks i and j. If the number of STRONG pixels exceeds a predetermined percentage or predetermined threshold number T3, the boundary is considered real. Otherwise it is imaginary.

The processor executes a chunk clustering component 50 (e.g., an algorithm or set of computer-executable instructions to merge chunks into objects. In one example, the chunks are merged into objects according a procedure as described by the following pseudocode:

1. Initialize chunk_classification [i] to −1, for i =1 to N, where N is the number of chunks
2. Initialize M (number of objects) to 0;
3. For i=1 to N , do steps 4-22;
   4. If (chunk_classification[i] ≠ −1), goto step 3
   5. M = M+1;      // start a new object
   6. chunk_classification [i] = M;
   7. K = 1;
   8. object[M]member[K] = i;
   9. No_new_member = TRUE;
   10. For j = 1 to N, do steps 11-18;
       11. If (chunk_classification[j] ≠ −1) goto step 10
       12. For k = 1 to K, do steps 13 -18;
           13. If (chunk [j] and chunk object[M]member[k] share an imaginary boundary) do steps 14-18; // merge chunk j to object M
               14. chunk_classification[j] = M;
               15. K = K+1;
               16. object[M]member[K] = j;
               17. No_new_member = FALSE;
               18. goto step 10;
   19. if (No_new_member = TRUE) do steps 20-21; // found all members for object M
       20. object[M]number_of_members = K;
       21. goto step 3;
   22. else goto step 9;//There are still new members for object M, continue searching;

The above procedure yields an array "chunk_classification [i] for i=1 to N", which specifies the object number the chunk is merged into. M is the number of objects. For each object m, a number "object[m]number_of_members" is specified, which contains the number of members for the object. An array "object[m]member" specifies the members of the object.

An object classifier 52 is executed to classify objects obtained from the above procedure as foreground or background, graphics or images or mixed, and small or normal sized. An object whose members are all IMAGE is classified as IMAGE, and an object whose members are all GRAPHICS is classified as GRAPHICS. Objects whose members include both IMAGE and GRAPHICS members are classified as MIXED. An object whose height and width (or surface area, or some other suitable metric(s)) do not exceed a predetermined threshold T4 is considered as SMALL.

In foreground/background classification, an object is classified to be the background if it satisfies two conditions: it has a large size (e.g. its height and width exceed a predetermined threshold T5); and it "contains" one or more other objects. The containment can be determined as follows: if the left border of object i is to the left side of the left border of object j, and the right border of object i is to the right side of the right border of object j, and the top border of object i is above the top border of object j, and the bottom border of object i is below the bottom border of object j, then object j is "contained" in object i.

In this manner, the system 30 identifies foreground image objects and mixed objects that exceed a predetermined size threshold T4, as suitable for AIE processing. The processor 32 then executes an AIE processing algorithm 54 to enhance these identified objects. Different AIE algorithms and/or parameters may be applied to image objects and mixed objects. AIE processing is not performed on objects that are non-image (e.g., graphics), below the size threshold T4, and/or background objects, thereby reducing AIE execution time, saving processing resources, and reducing image artifacts or defects that can occur when AIE is performed on such objects. The document can then be stored to memory 34, and/or printed, with the enhanced foreground images.

With regard to FIGS. 3-8, object types, object boundaries, and object relationships can differ from that which a human would recognize, in a poorly-constructed PDF document. Accordingly, the following figures illustrate scenarios that can be addressed using the herein described systems and methods. The following discussion pertains to objects that, by a human observer, can be distinguished as "images" and "graphics." For instance, such objects can be represented in a PDF document as "rasters," "strokes," and/or "fills." One such example is the splitting of an "image" into multiple independent components that are separately stored in the PDF, such that the image is not represented as a single image inside the PDF, but is represented as a set of mosaic tiles that are seemingly unrelated. The instances of AIE-relevant PDF ambiguities are discussed in more detail as follows.

Figure 3:
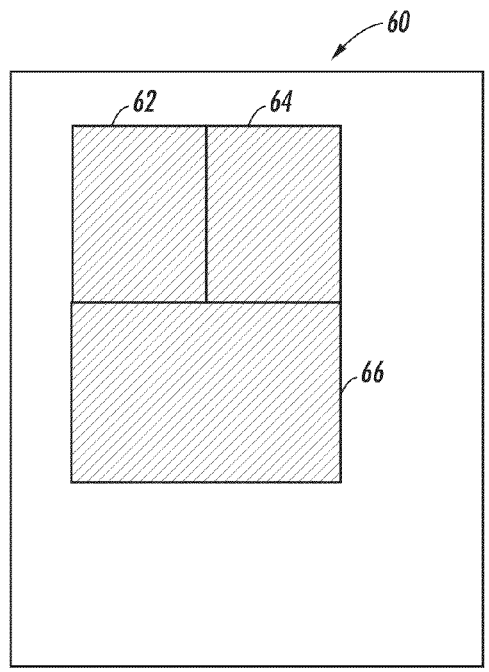
FIG. 3 illustrates a document, where one object is cut into three pieces.

When blocking or "splitting" images, a single input image is partitioned into multiple image objects inside the PDF specification. FIG. 3 illustrates a document 60, where one object is cut into three pieces 62, 64, and 66. The original image structure is difficult to deduce from the blocks, as they may come from one, two, or three images. Two kinds mistakes can be made in this scenario: one object is treated as multiple objects, or multiple objects are treated as one object. Either mistake may introduce image defects as erroneous image statistics will be gathered that will cause incorrect AIE decisions. Such ambiguity can be resolved by the described systems and methods, as detailed with regard to FIGS. 1 and 2.

Figure 4:
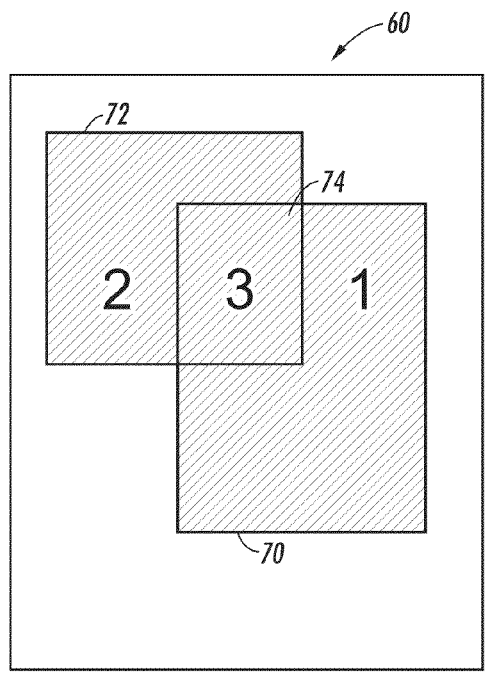
FIG. 4 illustrates a scenario in which the document comprises three overlapping objects.

FIG. 4 illustrates a scenario in which the document 60 comprises three objects 70, 72, 74. Object 74 cannot be attributed to be a part of object 70 or object 72. It also cannot be determined if any part of object 74 is foreground or background. Logically, object 74 might be a part of either object, but it might also be a totally different object or a blend between the two objects. These ambiguities can be resolved by the described systems and methods, as detailed with regard to FIGS. 1 and 2.

Figure 5:
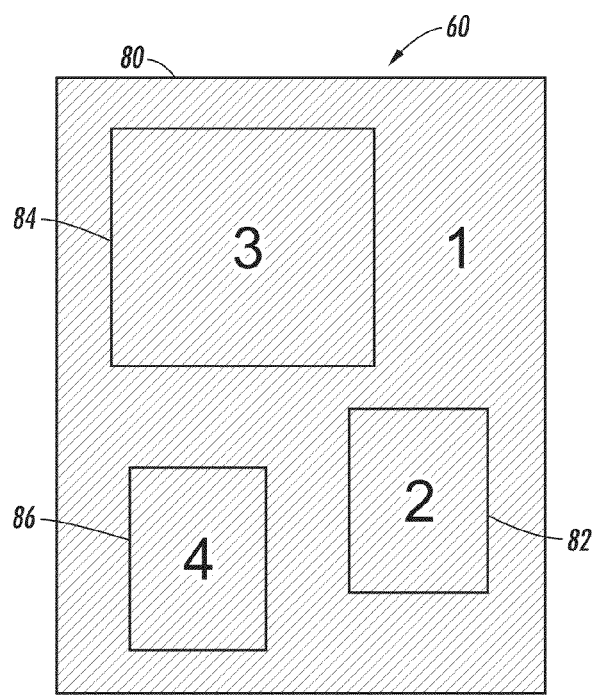
FIG. 5 illustrates a scenario in which the document comprises a background object that underlies three foreground objects.

FIG. 5 illustrates a scenario in which the document 60 comprises a background object 80 that underlies three foreground objects 82, 84, 86. In the foreground/background scenario, one image (e.g., the background object) may not be intended to be visually pleasing on its own, but rather it is intended to be a backdrop or frame for another set of images. Distinguishing the background image 80 from the foreground images 82, 84, 86 is performed as detailed with regard to FIGS. 1 and 2.

Figure 6:
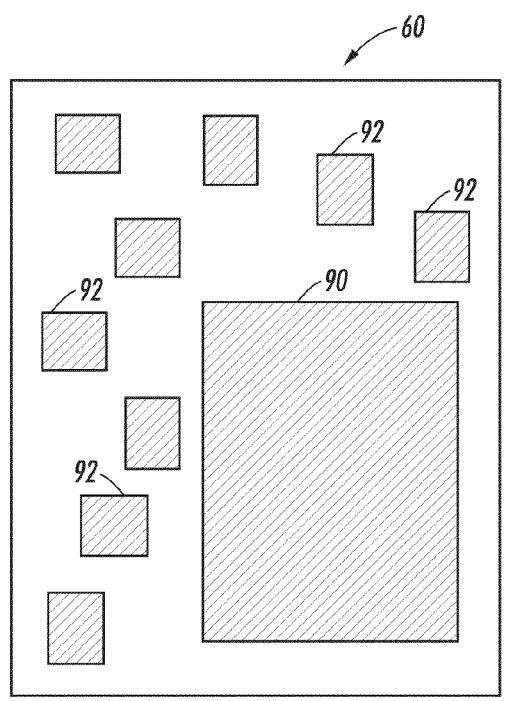
FIG. 6 illustrates a scenario in which the document comprises objects of different sizes.

FIG. 6 illustrates a scenario in which the document 60 comprises objects of different sizes. Not all images in the document 60 may be relevant to a human observer. One of the indicators for relevance is object size. In FIG. 6, one large object 90 is shown, along with several small objects 92. The relative size offers a strong indicator that the small images may be skipped in AIE processing. For instance, the described systems and methods facilitate comparing the surface area of the objects to a predetermined threshold T4 to determine whether they are of sufficient size to warrant AIE processing. The small objects 92, even though they may be foreground image objects, may be skipped during AIE processing to improve processing speed and economize processing resources.

Figure 7A:
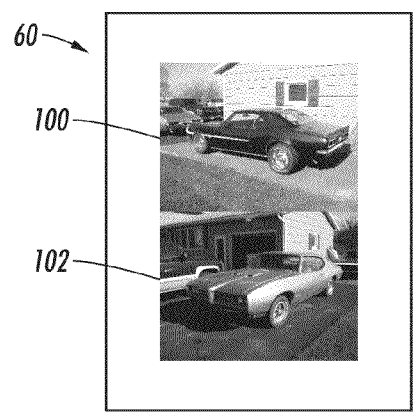
FIG. 7A illustrates an example of a document with two objects having a horizontal boundary therebetween.

FIG. 7A illustrates an example of a document 60 with two objects 100, 102 having a horizontal boundary therebetween. The boundary appears visually to a human observer as a seam, and is detectable by the system 30 of FIG. 2 as a data seam where pixel values on either side of the boundary are drastically different.

Figure 7B:
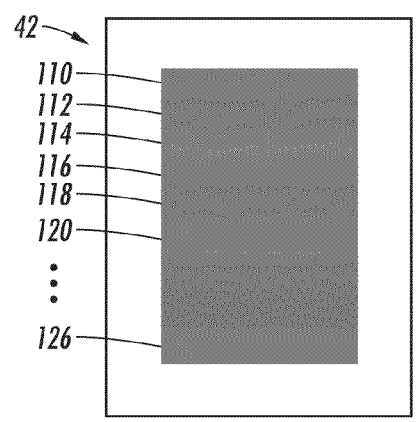
FIG. 7B illustrates a chunk ID map for the objects of FIG. 7A.

FIG. 7B illustrates a chunk ID map 42 for the objects 100, 102 of FIG. 7A. For instance, the objects may be arbitrarily segmented into several chunks with horizontal boundaries therebetween. In this example, the objects have been segmented into a first chunk 110, a second chunk 112, a third chunk 114, a fourth chunk 116, a fifth chunk 118, a sixth chunk 120, a etc., and an Nth chunk 126, where N is an integer. Using the described systems and methods, the boundary between each pair of chunks is evaluated to determine whether it is real or imaginary.

Figure 7C:
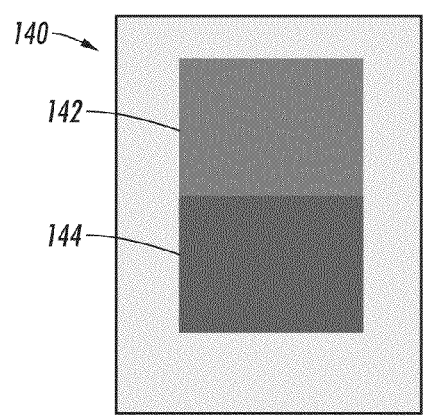
FIG. 7C illustrates de-chunking results for the document.

FIG. 7C illustrates de-chunking results 140 for the document 60. As is shown, chunks sharing an imaginary boundary are combined into a single object, while the boundary between chunk 118 and 120 has been retained since it is a real boundary, thus forming two objects 142, 144.

Figure 8A:
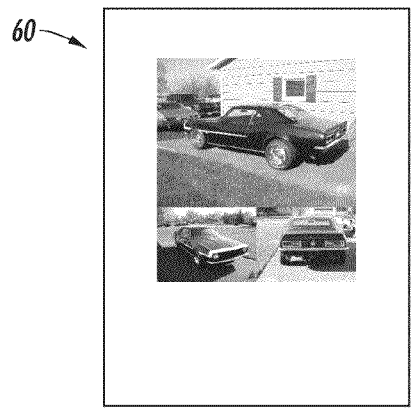
FIG. 8A illustrates an example of a document with three objects having a horizontal and vertical boundaries therebetween.

FIG. 8A illustrates an example of a document 60 with three objects 150, 152, 154 having a horizontal and vertical boundaries therebetween. The boundaries appear visually to a human observer as a seam, and are detectable by the system 30 of FIG. 2 as data seams where pixel values on either side of a boundary are drastically different.

Figure 8B:
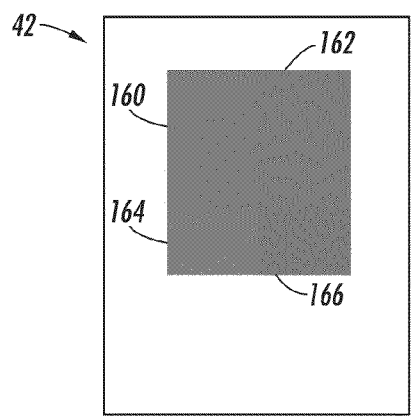
FIG. 8B illustrates a chunk ID map for the objects of FIG. 8A.

FIG. 8B illustrates a chunk ID map 42 for the objects 150, 152, 154 of FIG. 8A. For instance, the objects may be segmented into several chunks with horizontal and vertical boundaries therebetween. In this example, the objects have been segmented into a chunk 160, a chunk 162, a chunk 164, and a chunk 166. Using the above-described systems and methods, the boundary between each pair of chunks is evaluated to determine whether it is real or imaginary.

Figure 8C:
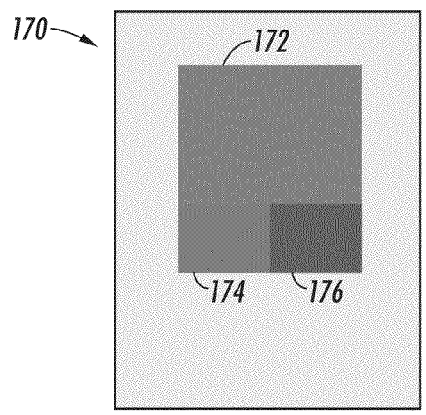
FIG. 8C illustrates de-chunking results for the document.

FIG. 8C illustrates de-chunking results 170 for the document 60. As is shown, chunks sharing an imaginary boundary are combined into a single object, while chunks sharing a real boundary are not combined. In this example, the boundary between chunk 160 and 162 has been determined to be an imaginary boundary, and therefore chunks 160 and 162 have been combined into a single object 172. All other chunk boundaries have been determined to be real, resulting in objects 174 and 176. If objects 174 and 176 are below the size threshold T4, and if object 172 is above the size threshold T4, then only object 172 will be subjected to AIE processing.

In this manner, the described systems and methods group artificially generated chunks into more natural and reasonable objects while retaining the boundaries between the true objects.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of identifying foreground image objects in portable document format (PDF) documents for automatic image enhancement (AIE) comprising: segmenting objects in a PDF document into a plurality of chunks; analyzing boundaries between pairs of the plurality of chunks to determine whether each boundary of said boundaries is real or imaginary; de-chunking the objects by retaining real boundaries and combining chunks that share an imaginary boundary; and classifying the de-chunked objects to identify objects for AIE processing, wherein a boundary shared by at least two of said objects is defined as a real boundary.

2. The method of claim 1, further comprising classifying objects as foreground or background objects.

3. The method of claim 2, further comprising classifying objects as image, graphics, or mixed objects.

4. The method of claim 3, further comprising comparing object size to a predetermined size threshold value and classifying objects having a size below the predetermined size threshold value as "small" and objects having a size equal to or greater than the predetermined size threshold value as "normal."

5. The method of claim 4, further comprising identifying objects that are classified as "mixed" or "image," "foreground," and "normal-sized" for AIE processing.

6. The method of claim 5, further comprising executing AIE on the identified objects.

7. The method of claim 6, further comprising outputting a refined PDF document with the identified objects enhanced.

8. The method of claim 6, further comprising refraining from executing AIE on objects taht are classified as one or more of "background," graphics," or "small-sized."

9. The method of claim 8, further comprising outputting a refined PDF document with the identified objects enhanced.

10. A selective image enhancement system for portable document format (PDF) documents, comprising: a memory that stores a PDF document; and a processor that: executes chunk generation instructions stored in the memory to segment PDF objects into a plurality of chunks; generates a chunk ID map, a chunk class map, and an image bitmap; executes a boundary classifier that determines whether boundaries between pairs of chunks are real or imaginary; executes chunk clustering instructions to combine chunks that share an imaginary boundary and retain real boundaries that define the PDF objects; executes an object classifier that classifies objects into different classes; wherein a boundary shared by at least two of said objects is defined as a real boundary, and identifies objects for automatic image enhancement (AIE) as a function of object class.

11. The system of claim 10, wherein the object classifier classifies an object an image object, a graphics object, or a mixed object.

12. The system of claim 11, wherein the object classifier classifies the object a background object or a foreground object.

13. The system of claim 12, wherein the object classifier classifies the object a "small" object or a "normal-sized" object as a function of a comparison of the object size to a predetermined size threshold value wherein an object size a size below the predetermined size threshold value as classified as "small" and an object size equal to or greater than the predetermined size threshold value is classified as "normal."

14. The system of claim 13, wherein the processor executes an AIE application on objects classified as "foreground," "image," and "normal-sized."

15. The system of claim 14, wherein the processor refrains from executing the AIE application on objects classified as one or more of "background," "graphics," or "small."

16. The system of claim 15, wherein the processor stores to the memory a refined PDF document with the enhanced objects.

17. The system of claim 16, wherein the processor outputs the refined PDF document to a printer for printing.

18. The system of claim 10, wherein the processor executes an AIE application on objects classified as "foreground," "image" or "mixed," and "normal-sized," and refrains from executing the AIE application on objects classified as one or more of "background," "graphics," or "small."

19. An apparatus for selectively enhancing images in a portable document format (PDF) document, comprising: means for segmenting objects in a PDF document into a plurality of chunks; means for analyzing boundaries between pairs of the plurality of chunks to determine whether each boundary is real or imaginary; means for de-chunking the objects by retaining real boundaries and combining chunks that share an imaginary boundary, wherein a boundary shared by at least two of said objects is defined as a real boundary; means for classifying the de-chunked objects to identify objects for AIE processing and means for executing an automatic image enhancement (AIE) application on the identified objects.

20. The apparatus of claim 19, wherein the de-chunked objects are classified as foreground or background objects, small or normal sized objects, and image or graphic objects.

21. The apparatus of claim 19, wherein the AIE application is executed on objects classified as "foreground," "image" or "mixed," and "normal-sized," and the AIE application is not executed on objects classified as one or more of "background," "graphics," or "small."

* * * * *